United States Patent
Ramappan et al.

(10) Patent No.: US 8,160,802 B2
(45) Date of Patent: Apr. 17, 2012

(54) CLOSED-LOOP ADAPTATION OF HOMOGENOUS CHARGE COMPRESSION IGNITION OPERATING ZONE BASED ON RINGING INDEX

(75) Inventors: Vijay Ramappan, Novi, MI (US);
Jun-Mo Kang, Ann Arbor, MI (US);
Allen B. Rayl, Waterford, MI (US)

(73) Assignee: GM Global Technology Operations LLC

( * ) Notice: Subject to any disclaimer, the term of this patent is extended or adjusted under 35 U.S.C. 154(b) by 552 days.

(21) Appl. No.: 12/429,751

(22) Filed: Apr. 24, 2009

(65) Prior Publication Data
US 2010/0274464 A1 Oct. 28, 2010

(51) Int. Cl.
*F02D 41/00* (2006.01)
*F02D 45/00* (2006.01)
*F02M 25/07* (2006.01)

(52) U.S. Cl. ...................................... 701/103

(58) Field of Classification Search .......... 701/103–105, 701/102, 110, 114, 115; 123/436, 295, 305
See application file for complete search history.

(56) References Cited

U.S. PATENT DOCUMENTS 7,370,616 B2 * 5/2008 Kuo et al. ................. 123/90.15
8,000,882 B2 * 8/2011 Ramappan et al. ........... 701/108

\* cited by examiner

*Primary Examiner* — Hieu T Vo

(57) ABSTRACT

An engine control system comprises a ringing index (RI) determination module, a fueling threshold determination module, and a combustion mode determination module. The ringing index (RI) determination module determines an RI value of a cylinder of an engine and compares the RI value and a predetermined RI threshold. The fueling threshold determination module determines a fueling threshold and adjusts the fueling threshold based on the comparison of the RI value and the RI threshold. The combustion mode determination module selects a combustion mode for the engine based on a comparison of a current fueling rate and the fueling threshold.

20 Claims, 3 Drawing Sheets

CLOSED-LOOP ADAPTATION OF HOMOGENOUS CHARGE COMPRESSION IGNITION OPERATING ZONE BASED ON RINGING INDEX

FIELD

The present disclosure relates to adaptation of an ignition mode operating zone and more particularly to adaptation of a homogenous charge compression ignition (HCCI) mode operating zone based on a ringing index.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Homogenous charge compression ignition (HCCI) engines combust an air/fuel mixture within cylinders to produce drive torque. HCCI engines may combust the air/fuel mixture in different combustion modes. In an HCCI combustion mode, the air/fuel mixture is automatically ignited when compressed by the pistons. In a spark ignition (SI) combustion mode, the air/fuel mixture is ignited by spark plugs. The HCCI combustion mode may improve efficiency and fuel economy of the engine over the SI combustion mode.

Engine control systems have been developed to operate a gasoline engine in the HCCI combustion mode and the SI combustion mode. Operation using the HCCI combustion mode has been limited to an HCCI operating zone. The HCCI operating zone may limit operation of HCCI combustion based on engine speed, mass airflow, or fueling rate.

SUMMARY

An engine control system comprises a ringing index (RI) determination module, a fueling threshold determination module, and a combustion mode determination module. The ringing index (RI) determination module determines an RI value of a cylinder of an engine and compares the RI value and a predetermined RI threshold. The fueling threshold determination module determines a fueling threshold and adjusts the fueling threshold based on the comparison of the RI value and the RI threshold. The combustion mode determination module selects a combustion mode for the engine based on a comparison of a current fueling rate and the fueling threshold.

In other features, the combustion mode comprises one of a homogeneous charge compression ignition (HCCI) combustion mode and a spark ignition (SI) combustion mode. The RI value is based on a signal from a pressure sensor corresponding to the cylinder. The RI threshold is based on an engine speed of the engine. The current fueling rate is set based on a desired torque of the engine.

In still other features, the combustion mode determination module commands the SI combustion mode when the current fueling rate is greater than the fueling threshold. The fueling threshold determination module adjusts the fueling threshold when an HCCI engine system is operating under an adaptation condition based on at least one of a desired torque, a mass airflow into the engine system, and the current fueling rate. The fueling threshold determination module increases the fueling threshold when the RI value is less than or equal to the RI threshold. The fueling threshold determination module decreases the fueling threshold when the RI value is greater than the RI threshold. The adaptation condition occurs when the current fueling rate is greater than an adaptation fueling rate.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
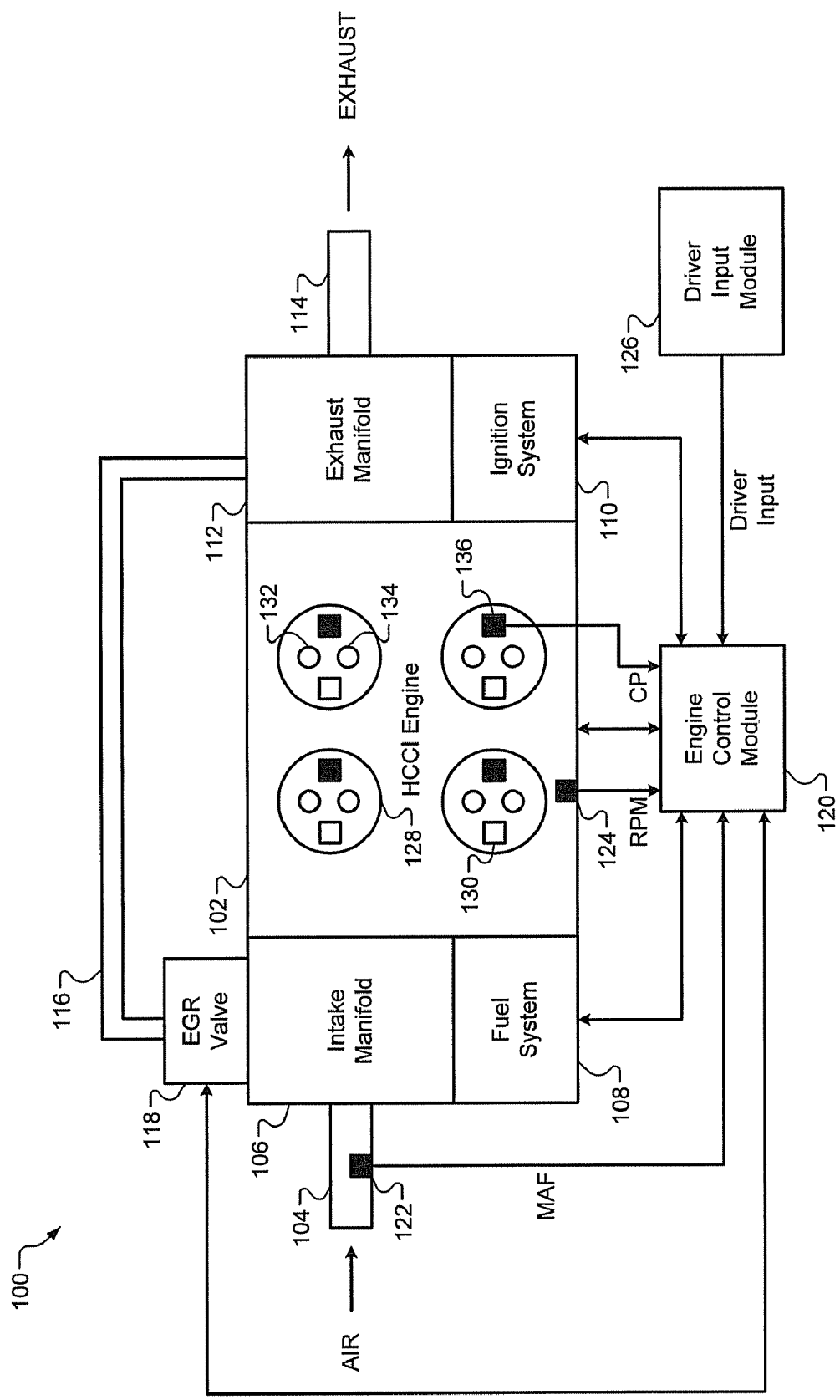
FIG. 1 is a functional block diagram of an exemplary implementation of a homogeneous charge compression ignition (HCCI) engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The engine control system according to the present disclosure operates the gasoline engine in a homogeneous charge compression ignition (HCCI) combustion mode and a spark ignition (SI) combustion mode. The HCCI combustion mode may reduce fuel consumption and emissions. HCCI operation may be limited to a predetermined HCCI operating zone in order to reduce combustion noise and protect the engine from damage due to excessive pressure increases associated with HCCI.

The HCCI operating zone may be defined by a fueling threshold. For example, when a current fueling rate exceeds the fueling threshold, control may exit the HCCI mode and switch to the SI mode. While in the HCCI combustion mode, the engine control system may adapt the operating zone to expand or decrease the use of HCCI.

Adaptation may occur when the engine system is operating under adaptation conditions. For example, adaptation conditions may occur while the engine system is operating in a steady-state operating condition. The steady-state operating condition may occur when a mass airflow and/or engine torque output are not changing beyond a predetermined value. Alternatively, adaptation conditions may occur when the current fueling rate is above an adaptation fueling rate. The adaptation fueling rate may be based on engine speed.

When the engine system is operating under adaptation conditions, engine ringing may be used to determine whether to increase or decrease the fueling threshold. Engine ringing may refer to a vibration created by high cylinder pressures associated with HCCI combustion. Ringing may be influenced by changing ambient conditions such as humidity, barometric pressure, temperature, and other conditions.

A ringing index is compared to a ringing threshold. The ringing index may be based on a signal from a pressure sensor in a cylinder. Excessive ringing may indicate possible engine damage and result in audible combustion noise. The ringing threshold may correspond to excessive ringing.

The fueling threshold may be increased or decreased based on the comparison of the ringing index and the ringing threshold. For example, the fueling threshold may be increased to expand the HCCI operating zone while the ringing index is less than or equal to the ringing threshold. Alternatively, the fueling threshold may be decreased to protect against engine damage and audible combustion noise while the ringing index is greater than the ringing threshold.

Referring now to FIG. 1, an exemplary implementation of an HCCI engine system 100 is shown. The HCCI engine system 100 includes an HCCI engine 102, an inlet 104, an intake manifold 106, a fuel system 108, an ignition system 110, an exhaust manifold 112, an outlet 114, an EGR line 116, an EGR valve 118, an engine control module 120, a mass air flow (MAF) sensor 122, an engine speed (RPM) sensor 124, and a driver input module 126. The HCCI engine 102 includes cylinders 128, spark plugs 130, intake valves 132, exhaust valves 134, and pressure sensors 136.

The HCCI engine 102 combusts an air/fuel mixture to produce a drive torque or a mechanical torque. Air is drawn into the HCCI engine 102 through the inlet 104 and the intake manifold 106. Air within the HCCI engine 102 is distributed into the cylinders 128. The MAF sensor 122 may generate a MAF signal based on a mass air flow into the engine 102. An engine load may be determined based on the signal from the MAF sensor 122.

The intake valves 132 selectively open and close to enable air to enter the cylinders 128. Although FIG. 1 depicts four cylinders, it should be appreciated that the HCCI engine 102 may include additional or fewer cylinders. For example, engines having 2, 3, 4, 5, 6, 8, 10, 12, and 16 cylinders are contemplated.

The fuel system 108 may inject fuel into the intake manifold 106 at a central location or may inject fuel into the intake manifold 106 at multiple locations. Alternatively, the fuel system 108 may inject fuel directly into the cylinders 128. The air mixes with the injected fuel and creates the air/fuel mixture in the cylinders 128.

Pistons (not shown) within the cylinders 128 compress the air/fuel mixture. At low to medium engine loads and low to medium engine speeds, the air/fuel mixture is automatically ignited when compressed. Here, the HCCI engine system 100 is operating in an auto-ignited or HCCI combustion mode. Otherwise, the ignition system 110 may ignite the air/fuel mixture or provide spark assist during HCCI operation via the spark plugs 130. Here, the HCCI engine system 100 is operating in an SI combustion mode. The combustion of the air/fuel mixture drives the pistons down, thereby driving a crankshaft (not shown) and producing the drive torque.

Combustion exhaust within the cylinders 128 may be forced out through the exhaust manifold 112 and the outlet 114 when at least one of the exhaust valves 134 are in an open position. The EGR line 116 and the EGR valve 118 may introduce exhaust gas into the intake manifold 106. The EGR line 116 extends from the exhaust manifold 112 to the EGR valve 118, and the EGR valve 118 may be mounted on the intake manifold 106 (as shown in FIG. 1) or remotely with another line connecting the EGR valve 118 to the intake manifold 106. The EGR line 116 transfers exhaust gas from the exhaust manifold 112 to the EGR valve 118. The EGR valve 118 selectively opens and closes to enable exhaust gas to enter the intake manifold 106.

The engine control module 120 controls operation of the HCCI engine system 100 based on various engine operating parameters. The engine control module 120 controls and communicates with the HCCI engine 102, the fuel system 108, the ignition system 110, and the EGR valve 118.

The engine control module 120 is further in communication with the RPM sensor 124 that generates an RPM signal based on a speed of the HCCI engine 102 in revolutions per minute. The engine control module 120 is further in communication with the driver input module 126 that generates a driver input signal based on, for example, an accelerator pedal position. The engine control module 120 is further in communication with the pressure sensors 136 that each generates a cylinder pressure (CP) signal based on a pressure in one of the cylinders 128. The pressure sensors 136 are located such that the pressure in each of the cylinders 128 may be measured.

Figure 2:
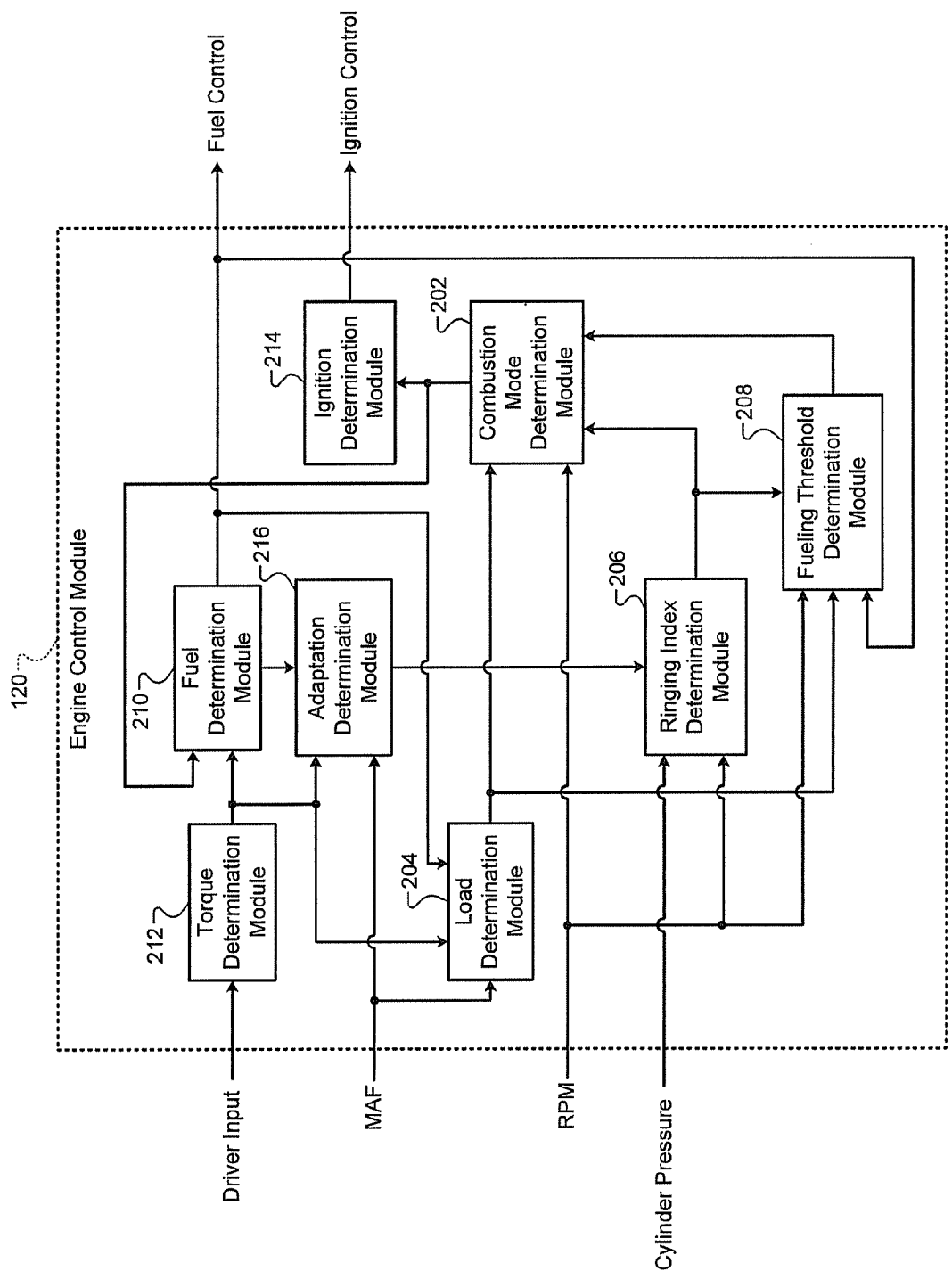
FIG. 2 is a functional block diagram of an exemplary implementation of an engine control module according to the principles of the present disclosure.

Referring now to FIG. 2, an exemplary implementation of the engine control module 120 is shown. A combustion mode determination module 202 determines a combustion mode based on RPM and the engine load as determined by a load determination module 204. In addition, the combustion mode determination module 202 receives signals from a ringing index (RI) determination module 206 and a fueling threshold determination module 208. The combustion mode determination module 202 determines whether the homogenous charge compression ignition (HCCI) engine system 100 is within operating conditions for the HCCI combustion mode or the SI combustion mode. The fuel system 108 and the ignition system 110 may control fueling and ignition based on the combustion mode.

A fuel determination module 210 determines a current fueling rate (F) for the fuel system 108. The fueling rate may be based on a desired torque from a torque determination module 212. The fueling rate may be based on the combustion mode. The torque determination module 212 may generate the desired torque based on input from the driver input module 126. The load determination module 204 may also determine the load based on the desired torque. An ignition determination module 214 may control ignition based on the combustion mode.

The fueling threshold determination module 208 determines a fueling threshold ($F_{THRS}$) for operating in the HCCI combustion mode. For example, the fueling threshold may be calculated using a calibrateable table ($F_{MIN}$) based on engine speed and/or engine load. The calibrateable table may be set to a minimum threshold.

For a current fueling rate exceeding the fueling threshold, the fueling threshold determination module 208 signals to the combustion mode determination module 202 that the HCCI combustion mode may not be allowed. For a current fueling rate not exceeding the fueling threshold, the fueling threshold determination module 208 signals to the combustion mode determination module 202 that the HCCI combustion mode may be allowed.

An adaptation determination module 216 determines whether the HCCI engine system 100 is operating under adaptation conditions based on the desired torque, a signal from a MAF sensor, and/or the current fueling rate. Adaptation conditions may occur if the desired torque and the MAF are not changing in value by more than a predetermined rate. Alternatively, the adaptation conditions may occur if the current fueling rate is greater than the adaptation fueling rate. The adaptation fueling rate may be based on engine speed or other operating conditions.

When the HCCI engine system 100 is determined to be operating under adaptation conditions, the adaptation determination module 216 enables the ringing index (RI) determination module 206. The RI determination module 206 calculates a ringing index (RI) average value for each cylinder. The RI determination module 206 receives the cylinder pressure signals from cylinder pressure sensors 136 and determines the RI average value based on one of the CP signals for each of the cylinders 128.

The RI average value is typically greater than 1 while in HCCI combustion mode. The RI average value is typically less than 1 while in SI combustion mode. The RI average value ($RI^i_{avg}$) is determined according to the following equation:

$$RI^i_{avg} = \frac{RI^i(k) + RI^i(k-1) + \ldots + RI^i(k-n-1)}{n},$$

where i is a cylinder number, k is a current engine cycle, and n is a number of samples for which the running average is determined.

The RI determination module 206 compares RI average value ($RI^i_{avg}$) with an RI threshold ($RI_{THRS}$) based on a cylinder number and the engine speed. The RI threshold may be a calibrateable value based on testing data. For example, the RI threshold may be determined according to the following table:

| | Cylinder | | | |
|---|---|---|---|---|
| RPM | 1 | 2 | 3 | 4 |
| 1000 | 3 | 3 | 3 | 3 |
| 1400 | 4 | 4 | 4 | 4 |
| 1800 | 5 | 5 | 5 | 5 |
| 2200 | 5 | 5 | 5 | 5 |
| 2600 | 5 | 5 | 5 | 5 |

The RI determination module 206 compares the RI average value for each cylinder 128 to the corresponding RI threshold for each cylinder 128 to determine whether excessive ringing is occurring.

Under adaptation conditions, the fueling threshold determination module 208 may adapt the fueling threshold based on a signal from the RI determination module 206. The fueling threshold determination module 208 may calculate the fueling threshold by adding a fueling adaptation scalar ($F_{RI}$) to the minimum fueling threshold. The fueling threshold determination module 208 may retrieve the fueling adaptation scalar from a stored value in a table. For example, the fueling adaptation scalar may be a stored value according to the following table:

| RPM range | $F_{RI}$ |
|---|---|
| 1000 | 0.10 |
| 1500 | 0.15 |
| 2000 | 0.20 |

-continued

| RPM range | $F_{RI}$ |
|---|---|
| 2500 | 0.20 |
| 3000 | 0.30 |

The fueling threshold determination module 208 may also retrieve a maximum fueling threshold ($F_{MAX}$), which may be a calibrateable table based on engine speed or other operating conditions. The maximum fueling threshold may be used as a hard limit for the HCCI operating zone.

When the RI determination module 206 determines that the RI average value is greater than the RI threshold, the fueling threshold determination module 208 decreases the fueling adaptation scalar by a calibrateable increment. The fueling threshold determination module 208 stores the new fueling adaptation scalar in the table location corresponding to the operating conditions.

By decreasing the fueling adaptation scalar, the HCCI operating zone will be limited to a lower fueling threshold. Decreasing the fueling threshold will decrease the operating zone for the HCCI combustion mode. The RI determination module 206 may signal to the combustion mode determination module 202 that the HCCI combustion mode is not allowed.

Alternatively, when the RI determination module 206 determines that the RI average value is less than or equal to the RI threshold, the fueling threshold determination module 208 may or may not increase the fueling adaptation scalar by a calibrateable increment. Under adaptation conditions, the fueling threshold determination module 208 increases the fueling adaptation scalar by a calibrateable increment. Since no excessive ringing is occurring at the current fueling rate, the fueling threshold determination module 208 stores the new fueling adaptation scalar in the table location corresponding to the operating conditions.

By increasing the fueling adaptation scalar, the HCCI operating zone will be limited to a higher fueling threshold. Increasing the fueling threshold will expand the operating zone for the HCCI combustion mode. The fueling threshold determination module 208 may signal to the combustion mode determination module 202 that the HCCI combustion mode may continue.

When the RI determination module 206 determines that the RI threshold has not been exceeded and the fueling threshold determination module 208 determines that the fueling threshold has not been exceeded, the fueling threshold determination module may retain the current fueling adaptation scalar value. Neither a decrease nor an expansion of the operating zone may occur. The fueling threshold determination module 208 may indicate to the combustion mode determination module 202 that the HCCI combustion mode may continue.

Figure 3:
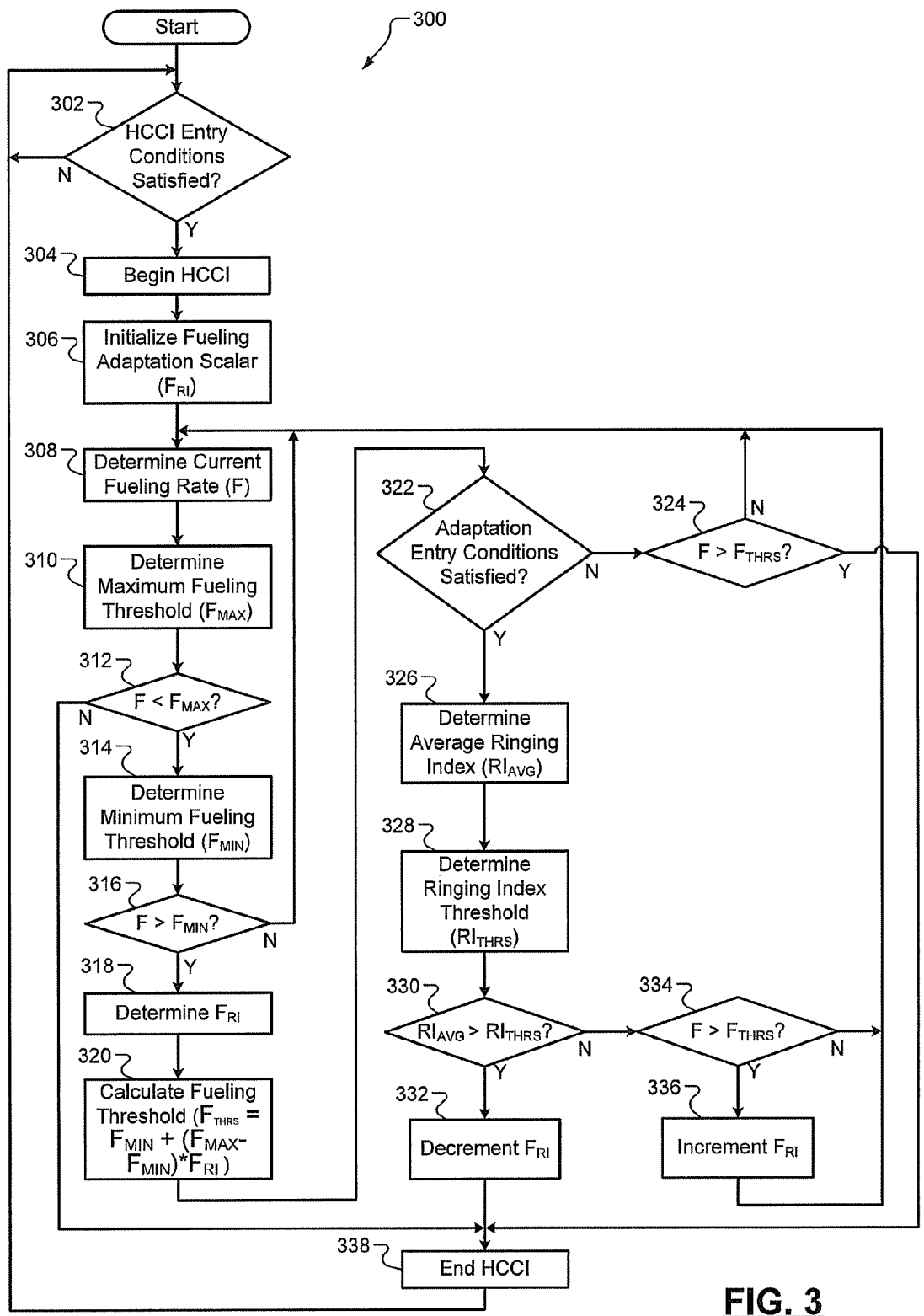
FIG. 3 is a flowchart depicting exemplary steps performed in the engine control module.

Referring now to FIG. 3, a flowchart 300 depicts exemplary steps of an engine control system. Control begins in step 302 where the combustion mode determination module 202 determines if HCCI combustion mode entry conditions are satisfied. In step 304, the HCCI combustion mode begins. In step 306, the fueling adaptation scalar may be initialized to a value of 0 or a previously stored value in a memory module. The fuel determination module 210 determines a current fueling rate in step 308.

In step 310, the fueling threshold determination module 208 retrieves a maximum fueling threshold for the HCCI combustion mode. In step 312, the fueling threshold determination module 208 determines if the current fueling rate is less than the maximum threshold. When the current fueling rate is less than the maximum fueling threshold, control continues to step 314. Otherwise, control may end the HCCI combustion mode in step 338 and switch to the SI combustion mode.

In step 314, control retrieves the minimum fueling threshold. In step 316, control determines whether the current fueling rate is greater than the minimum threshold. When the current fueling rate is greater than the minimum fueling threshold, control continues to step 318 to determine the fueling adaptation scalar. Otherwise, control returns to step 308. In step 320, the fueling threshold determination module 208 calculates the fueling threshold for the HCCI combustion mode based on the minimum fueling threshold, the maximum fueling threshold, and the fueling adaptation scalar. Control continues in step 322, where the adaptation determination module 216 determines whether the engine system 100 is operating under adaptation conditions.

When the engine system 100 is not operating under adaptation conditions, the fueling threshold determination module 208 determines whether the current fueling rate exceeds the fueling threshold in step 324. When the current fueling rate exceeds the fueling threshold, control ends the HCCI combustion mode and switches to the SI combustion mode in step 338. Otherwise, the HCCI combustion mode may continue.

When the engine system 100 is operating under adaptation conditions, control proceeds to step 326. In step 326, the ringing index (RI) determination module 206 determines the RI average value for each cylinder based on a signal from the pressure sensor 130 in the cylinder 128. In step 328, the RI determination module 206 determines the RI threshold for each cylinder.

In step 330, the RI determination module compares the RI average value and the RI threshold. When the RI average value is greater than the RI threshold, the fueling threshold determination module 208 decreases the fueling threshold by decrementing the fueling adaptation scalar in step 332. Control then ends the HCCI combustion mode in step 338.

When the RI average value is less than or equal to the RI threshold, control continues to step 334. In step 334, the fueling threshold determination module 208 compares the current fueling and the fueling threshold.

When the current fueling rate is greater than the fueling threshold, the fueling threshold determination module 208 increases the fueling threshold by incrementing the fueling adaptation scalar in step 336. Control may continue in the HCCI combustion mode.

When the current fueling rate is less than or equal to the minimum fueling threshold, control may remain in the HCCI combustion mode without any increase or decrease in the fueling threshold.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system, comprising:
    a ringing index (RI) determination module that determines an RI value of a cylinder of an engine, wherein the RI determination module compares the RI value and a predetermined RI threshold;
    a fueling threshold determination module that determines a fueling threshold, wherein the fueling threshold determination module adjusts the fueling threshold based on the comparison of the RI value and the RI threshold; and
    a combustion mode determination module that selects a combustion mode for the engine based on a comparison of a current fueling rate and the fueling threshold.

2. The engine control system of claim 1, wherein the combustion mode comprises one of a homogeneous charge compression ignition (HCCI) combustion mode and a spark ignition (SI) combustion mode.

3. The engine control system of claim 1, wherein the RI value is based on a signal from a pressure sensor corresponding to the cylinder.

4. The engine control system of claim 1, wherein the RI threshold is based on an engine speed of the engine.

5. The engine control system of claim 1, wherein the current fueling rate is set based on a desired torque of the engine.

6. The engine control system of claim 2, wherein the combustion mode determination module commands the SI combustion mode when the current fueling rate is greater than the fueling threshold.

7. The engine control system of claim 1, wherein the fueling threshold determination module adjusts the fueling threshold when an HCCI engine system is operating under an adaptation condition based on at least one of a desired torque, a mass airflow into the engine system, and the current fueling rate.

8. The engine control system of claim 7, wherein the fueling threshold determination module increases the fueling threshold when the RI value is less than or equal to the RI threshold.

9. The engine control system of claim 7, wherein the fueling threshold determination module decreases the fueling threshold when the RI value is greater than the RI threshold.

10. The engine control system of claim 7, wherein the adaptation condition occurs when the current fueling rate is greater than an adaptation fueling rate.

11. A method comprising:
    determining a ringing index (RI) value of a cylinder of an engine and comparing the RI value and a predetermined RI threshold;
    determining a fueling threshold and adjusting the fueling threshold based on the comparison of the RI value and the RI threshold; and
    selecting a combustion mode for the engine based on a comparison of a current fueling rate and the fueling threshold.

12. The method of claim 11, further comprising selecting the combustion mode from one of a homogeneous charge compression ignition (HCCI) combustion mode and a spark ignition (SI) combustion mode.

13. The method of claim 11, further comprising determining the RI value based on a signal from a pressure sensor corresponding to the cylinder.

14. The method of claim 11, further comprising determining the RI threshold based on an engine speed of the engine.

15. The method of claim 11, further comprising determining the current fueling rate based on a desired torque of the engine.

16. The method of claim 12, further comprising commanding the Si combustion mode when the current fueling rate is greater than the fueling threshold.

17. The method of claim 11, further comprising adjusting the fueling threshold when an HCCI engine system is operating under an adaptation condition based on at least one of a desired torque, a mass airflow into the engine system, and the current fueling rate.

18. The method of claim 17, further comprising increasing the fueling threshold when the RI value is less than or equal to the RI threshold.

19. The method of claim 17, further comprising decreasing the fueling threshold when the RI value is greater than the RI threshold.

20. The method of claim 17, further comprising operating under the adaptation condition when the current fueling rate is greater than an adaptation fueling rate.

* * * * *